United States Patent
Scholz et al.

(10) Patent No.: US 8,713,533 B2
(45) Date of Patent: Apr. 29, 2014

(54) MODULE-CODE VERIFICATION LAYER TO AUTOMATICALLY VALIDATE USER INPUT

(75) Inventors: Martin Scholz, Nussloch (DE); Christian Behrens, Weisloch (DE); Steffen Rotsch, Rauenberg (DE)

(73) Assignee: SAP AG, Walldorf (DE)

( * ) Notice: Subject to any disclaimer, the term of this patent is extended or adjusted under 35 U.S.C. 154(b) by 1417 days.

(21) Appl. No.: 11/924,257

(22) Filed: Oct. 25, 2007

(65) Prior Publication Data

US 2009/0113390 A1    Apr. 30, 2009

(51) Int. Cl.
*G06F 9/44*    (2006.01)

(52) U.S. Cl.
USPC ............ 717/125; 717/105; 717/109; 717/113

(58) Field of Classification Search
None
See application file for complete search history.

(56) References Cited

U.S. PATENT DOCUMENTS

| | | | | |
|---|---|---|---|---|
| 7,519,946 | B2 * | 4/2009 | Celi et al. | 717/109 |
| 7,614,037 | B2 * | 11/2009 | Gavrilov | 717/105 |
| 8,365,144 | B1 * | 1/2013 | Webb | 717/109 |
| 8,392,886 | B2 * | 3/2013 | Sweis et al. | 717/125 |
| 2004/0143627 | A1 * | 7/2004 | Dietl | 709/203 |
| 2006/0059468 | A1 * | 3/2006 | Heirich | 717/125 |
| 2006/0080382 | A1 * | 4/2006 | Dutta et al. | 709/203 |
| 2006/0212798 | A1 * | 9/2006 | Lection et al. | 715/513 |
| 2007/0240062 | A1 * | 10/2007 | Christena et al. | 715/741 |
| 2008/0082962 | A1 * | 4/2008 | Falk et al. | 717/113 |
| 2008/0178126 | A1 * | 7/2008 | Beeck et al. | 715/863 |
| 2008/0301668 | A1 * | 12/2008 | Zachmann | 717/173 |
| 2009/0271768 | A1 * | 10/2009 | Goodson | 717/125 |

OTHER PUBLICATIONS

Vieira et al., Automation of GUI testing using a model-driven approach, May 2006, 6 pages.*
Yuan et al., Covering array sampling of input event sequences for automated gui testing, Nov. 2007, 4 pages.*

* cited by examiner

*Primary Examiner* — Thuy Dao
(74) *Attorney, Agent, or Firm* — Kenyon & Kenyon LLP

(57) ABSTRACT

Methods and systems for verifying module codes are presented. The module code may be verified by associating the module code with a user interface screen and determining whether the module code was generated from the user interface screen. A module corresponding to the module code may be executed if the module code is verified. The module code may be verified by using routines from a user interface framework system. The module code may be verified by determining whether a user interface element associated with the module code is disabled. The module code may be verified by determining whether each user interface element associated with the module code is enabled. The module code may be verified by insuring that the module code was generated by the selection of a user interface element. The module codes may be received from a front-end system and verified on a back-end system.

18 Claims, 6 Drawing Sheets

MODULE-CODE VERIFICATION LAYER TO AUTOMATICALLY VALIDATE USER INPUT

BACKGROUND

The present invention relates to user interface framework systems and more particularly to verifying module codes generated by the selection of user interface elements in a computer system.

User interface (UI) framework systems provide tools that aid in developing UIs. Some applications developed using UI framework systems are designed to have an application that controls a UI and modules that implement business logic. The selection of a UI element, e.g. a button, may trigger the generation of a module code that may identify a module for execution to implement the business logic. The application often is executing on a front-end system and sends to a back-end system module codes that identify module on the back-end system to execute. The inventors of the present invention perceived that it can be difficult to verify that the module codes received on a back-end system represent valid UI element selections on the front-end system.

FIG. 1 illustrates an application 102 controlling 101 a user interface (UI) 104 as part of a UI framework system 124. The UI 104 may include several UI elements 106.1-106.5 (collectively 106) that are displayed to an operator and may be manipulated by the operator to control operation of an executing application 102. The UI 104 may have been developed under a UI framework system 124 such as DYNPROS™ from SAP™ that provides tools for developing UIs. Under DYNPROS™, modules 116 are developed to implement the logic for when a UI element 106 is selected. The modules 116 may reside on a back-end system 112 and are executed when UI elements are selected. For example, the UI element 106.3 labeled "Create New Contract" may be associated with a module 116 written to implement the logic when "Create New Contract" 106.3 is selected. The module code 108 may be used to identify the module 116. Under some current UI framework systems 124 the application 102 receives a module code 108.1 when "Create New Contract" is selected. The application 102 may send the module code 108.2 to a back-end system 112 to execute the module 116 corresponding to the module code 108.2 that was developed to implement the logic for "Create New Contract."

Under the UI framework DYNPROS™, the application 102 may disable a UI element 106 if the operator may not select the UI element 106. For example, UI element 106.3 may be disabled by the application 102 if the operator has not filled in UI element 106.4 labeled "Contract" and UI element 106.5 labeled "Date." The UI 104 may include a UI element 106.1 labeled "Module Code" for entering module codes 108 directly by an operator. This UI element 106.1 may be included because it may be more convenient for an operator to enter the module code 108 directly rather than have to select the UI element 106.

The inventors of the present invention perceived that module codes 108 that do not correspond to enabled UI elements 106 may be sent to the back-end system, because the operator may enter the module code 108 directly using UI element 106.1. For example, UI element 106.4 labeled "Contract" and UI element 106.5 labeled "Date" may not have been filled in, so the application 102 may have disabled the UI element 106.3 labeled "Create New Contract" and the module code 108 "create_contract" should not be sent to the back-end. But, a operator could enter "create_contract" in UI element 106.1, which would be sent to the application 102 and/or the UI framework 124, and "create_contract" could then be sent to the back-end system 112 by the application 102 and/or UI framework 124, despite the fact that the UI element 106.3 is disabled. The inventors further perceived that it might be possible for a hacker to develop a program to send a module code 108 directly to the back-end system 112 or to send a module code 108 to the application 102 without using the UI 104.

Accordingly, there is a need in the art for a method of verifying that a module code received on a back-end system could have been generated by a UI of an executing application on a front-end system.

DETAILED DESCRIPTION

The present invention is a module code verification layer executing on a back-end system that responsive to receiving a module code, may associate the received module code with a user interface screen having screen elements. The present invention may then verify the module code, and if the module code is verified then the present invention may execute a module corresponding to the module code, otherwise the present invention may report that the module corresponding to the module code will not be executed. In an embodiment, the module code verification layer may use a UI framework so that no application specific logic is required to implement the module code verification layer. In an embodiment, the module code verification layer resides on the back-end system.

Figure 1:
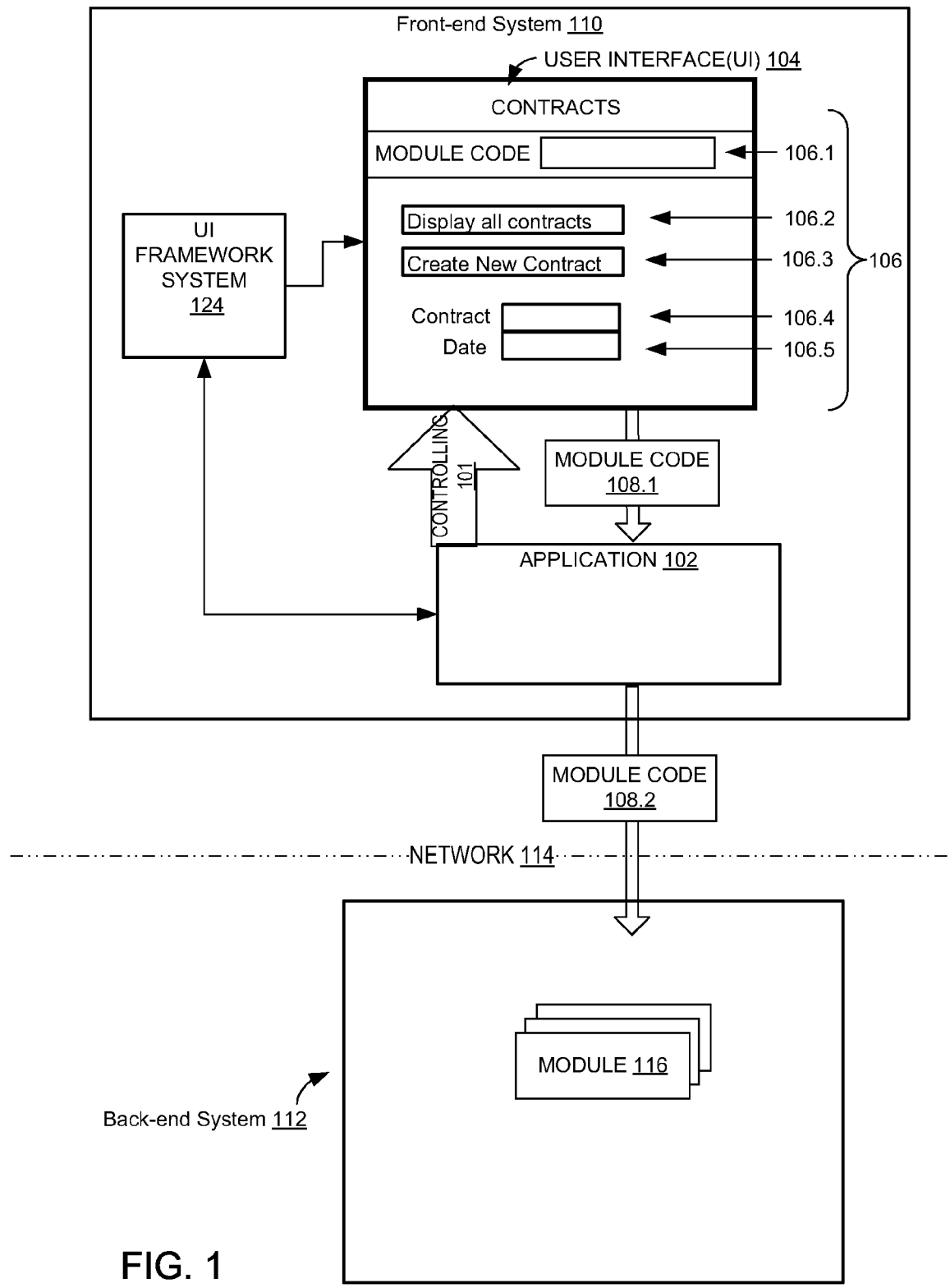
FIG. 1 illustrates the relationship between a user interface and an application under a UI framework that implements functionality with module codes.
Figure 2:
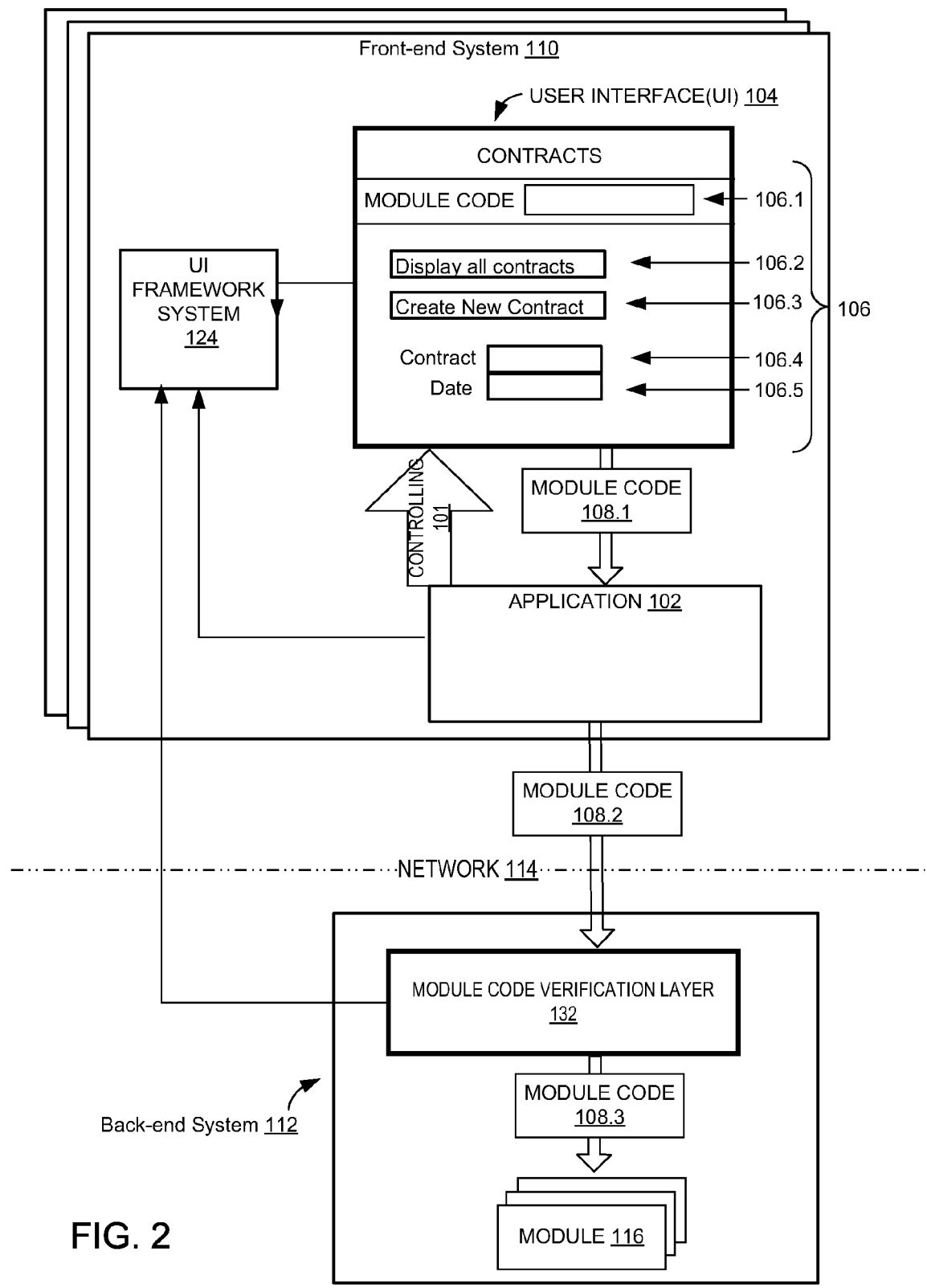
FIG. 2 illustrates an overview of an embodiment for a module code verification layer.

FIG. 2 illustrates an overview of an embodiment for a module code verification layer. As shown in FIG. 2, a computer system may include a plurality of front-end systems 110 and a back-end system 112 in communication with front-end systems 110 via a network 114. A front-end system 110 may be a computing device such as a desk-top computer. A back-end system 112 may be a computing device such as a server. The network 114 may be a local area network or the Internet, or any communications network, or combination of communications network as is well-known in the art. The front-end systems 112 may include an application 102, a user interface 104, and UI framework system 124 as in known systems. The UI framework system 124 may be support programs to implement the architecture for a UI framework. For example, the UI framework system 124 may include execution support for determining when the UI 104 should be displayed.

The user interface 104 may include various UI elements 106 that represent commands to be performed by the computer system. One of the UI elements 106.1 permits an operator to enter module codes 108 directly into the UI 104. The back-end system 112 may include various modules 116 and a module code verification layer 132. The module code verification layer 132 receives module codes 108.2 from the front-end system 110 for processing by the back-end system 112.

A user may select a UI element 106 which causes a module code 108.1 to be sent to the application 102. Alternatively, the user may enter a module code 108.1 directly into UI element 106.1 labeled "Module Code." The application 102 can send the module code 108.2 directly to the module code verification layer 132 without verifying that the module 116 corresponding to the module code 108 should be executed. The module code verification layer 132 receives the module code 108.2 and using the UI framework system 124 verifies that the module 116 corresponding to the module code 108.2 should be executed. In an embodiment, the module code verification layer 132 determines whether the module code 108.2 is verified based on whether the module code 108.2 is associated with a UI element 106 that is disabled. In an embodiment, the module code verification layer 132 then executes the module 116 corresponding to the module code 108.3.

Figure 3:
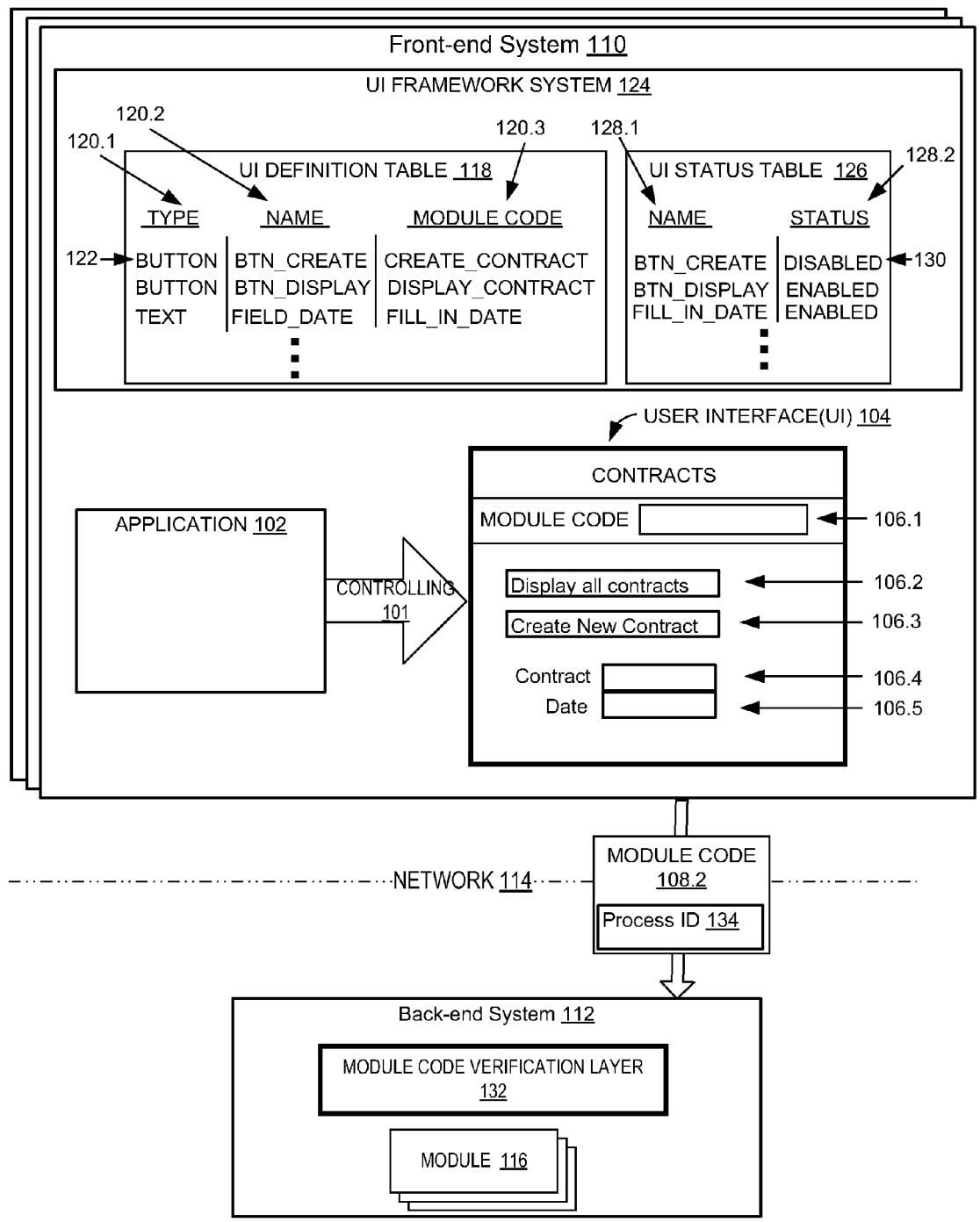
FIG. 3 illustrates an overview of an embodiment for an architecture for a UI framework.

FIG. 3 illustrates an overview of an embodiment for an architecture for a UI framework 124. A back-end system 112 and front-end systems 110 are similar to FIG. 2, but now the front-end systems 110 include a UI definition table 118 and a UI status update table 126, which are both used by the UI framework system 124 for the UI 104. The UI definition table 118 stores a mapping between user interface elements available for display and the module codes that can be passed to the back-end system. The UI status table 126 distinguishes between UI elements that are enabled and those that are disabled, or not displayed.

The application developer develops the UI 104 at design time. The user interface (UI) 104 may be a definition of a UI 104 that includes UI elements 106. The UI 104 may be developed with a graphical user interface (GUI) tool for developing UIs. Each of the UI elements 106 may be linked to modules 116 residing on a back-end 112. Each of the modules 116 may implement logic such as business logic on a back-end 112. For example the module 116 may interact with a customer relationship management (CRM) system, or the module 116 may create files, access databases, and in general the module 116 may implement the logic associated with the UI element 106. The UI definition table 118 is defined at design time to link the UI elements 106 to the modules 116. In the embodiment illustrated in FIG. 3, the UI definition table 118 has three fields per UI element 120. A type field 120.1 for the type of UI element, e.g. button, text field, etc. Although, static UI elements 106 are illustrated, the UI 104 could include any type of UI element 106 known in the art, such as drag and drop elements, drop down menus, etc., and the UI element 106 may be dynamic in that a single UI element 106 may refer to another table or object that may have multiple UI elements 106. The UI definition table 118 may further include a field for the name 120.2 of the UI element 106. The name 120.2 is the name 120.2 that would be used within the UI architecture, e.g. by the application 102 to disable the UI element 106. The UI definition table 118 may further include a field module code 120.3 that gives the module code 120.3 that should be sent to the back-end 112 to be executed when the UI element 106 is selected. The UI definition table 118 may include (not illustrated) a field for the display name of the UI element 106, e.g. the display name for UI element 106.3 is "Create New Contract." For example, the UI element 106.3 labeled "Create New Contract" has a row 122 in the UI definition table 118 with the values Type 120.1 button, since the UI element 106.3 labeled "Create New Contract" is a button. The name 120.2 of the UI element 106.3 is "BTN_CREATE." This name was selected by the application developer or may have been generated by the UI framework system 124. The name 102.2 is used to identify the UI element 106.3 within the UI framework system 124. So, the name 102.2 may be used by the application 102 to refer to the UI element 106.3. Finally, the row 122 contains an entry for module code 120.3, "create_contract" which is used to identify a module 116 on the back-end 112.

A UI status table 126 may be used by the UI framework system 124 to indicate the current status of each of the UI elements 106. During execution time, the application 102 may adjust the UI 104 by enabling, disabling, or hiding UI elements 106. The UI status table 126 may include two fields 128. A first field 128.1 records the name of the UI element 106 that was chosen and recorded in the UI definition table 118. A status field 128.2 may indicate the status of the UI element 106. For example, row 130 of UI status table 126 may be a row during execution time of the application 102 that indicates the current status of the UI elements 106 of the UI 104. The first value of the row 130 may be "Btn_create" which is the name of the UI element 106.3 labeled "Create New Contract" for display purposes. The status field for "Btn_create" element may indicate that the status 128.2 is disabled. The UI framework system 124 may display the UI element 106.2 shaded to indicate that the UI element 106.2 is "disabled."

The module code 108 may be sent to the back-end system 112 from the UI framework system 124 or the application 102. The module code 108.2 may include a Process ID 134 or other identifying indicia that can be used by the module code verification layer 132 to identify the process on the front-end system 110 associated with the UI 104, and the Process ID 134 may also be used by the back-end system 112 to identify which front-end system 110 generated the module code 108.2.

Figure 4:
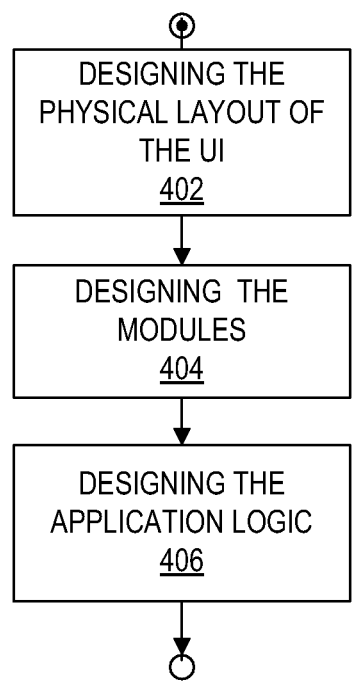
FIG. 4 illustrates one embodiment of a method for designing a UI with a UI framework system.

FIG. 4 illustrates one embodiment of a method for designing a UI 104 with a UI framework system 124. The flow begins with designing the physical layout of the UI 402. The UI may be designed with tools that are part of the UI framework system. The definition of the UI may be stored in tables that are associated with the UI framework system. The flow continues with designing the modules 404. The modules that implement the logic that needs to be carried out when a UI element is selected need to be designed. This step may also include coding the modules and making the modules accessible on a back-end system. The modules are associated with the UI elements in a table that is part of the UI framework system. The flow continues with designing the application logic 406. This step may include designing the application that will control the UI that the UI framework system will call when the UI needs to be displayed. The application may disable or hide buttons that may not be selected by the user. One skilled in the art will recognize that the steps illustrated in FIG. 4 may be re-ordered or intermixed.

Figure 5:
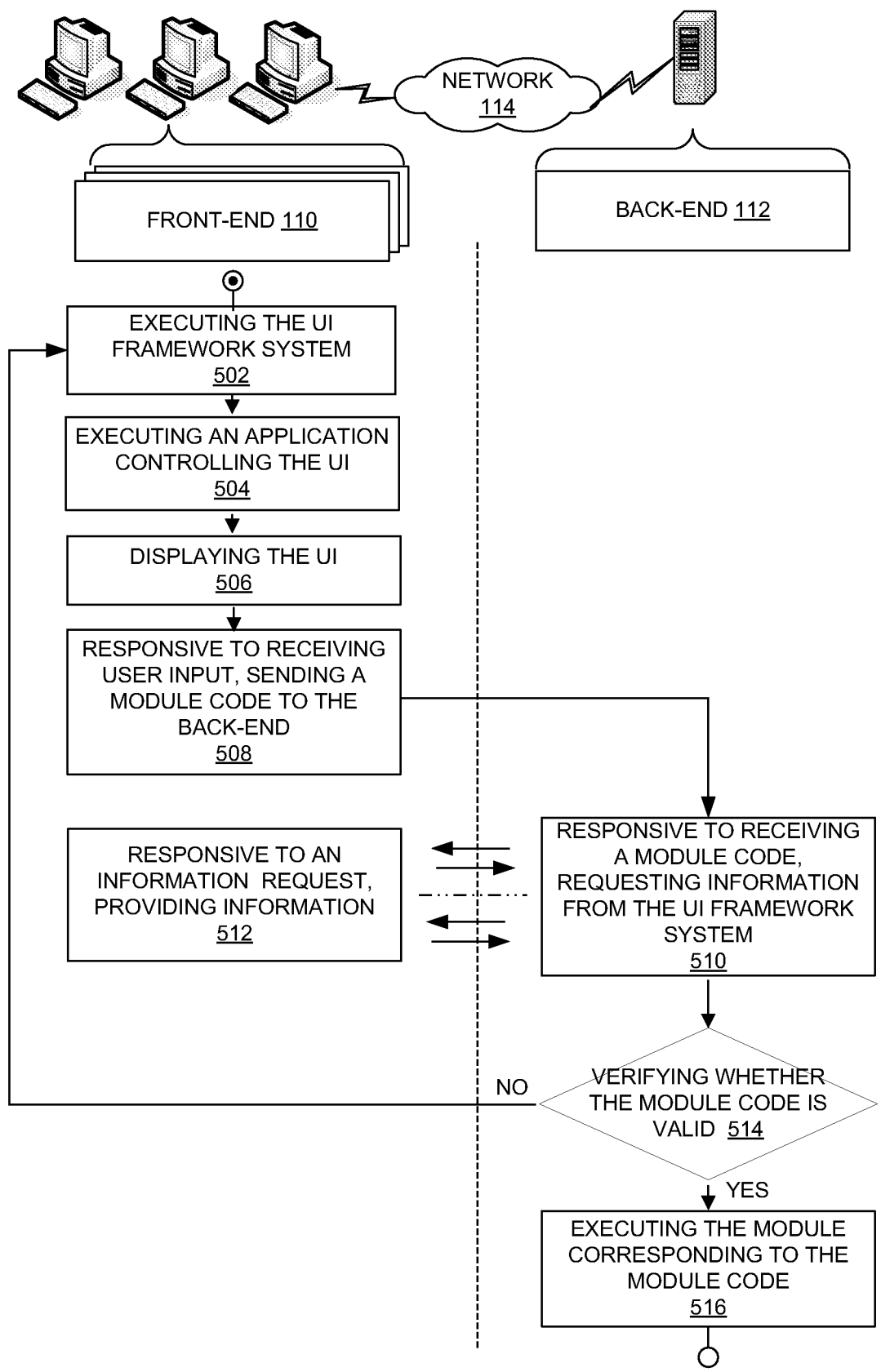
FIG. 5 illustrates one embodiment of a method for executing modules corresponding to module codes that are generated by the selection of UI elements.

FIG. 5 illustrates one embodiment of a method for executing modules corresponding to module codes that are generated by the selection of UI elements. The method is implemented with a module code verification layer executing on a back-end system 112. The UI frame work system and the application controlling the UI reside on the front-end system 110. The flow begins on one front-end system 110 with executing the UI framework system 502. The UI framework system may execute on the front-end system 110 and determine when a UI needs to be displayed to an operator. The flow continues with executing an application controlling the UI 504. The UI framework system may execute an application that controls the UI. The application that controls the UI may make adjustments to the UI, such as enabling or disabling UI elements based on the current state of the application. The adjustments made to the UI may be stored in tables as part of the UI framework system. The application controlling the UI may then return control to the UI framework system. The flow continues with displaying the UI 506. The UI framework system then displays the UI with the adjustments that have been made by the application controlling the UI. The UI framework system may examine a UI status table to determine the status of each of the UI elements of the UI. The flow continues with responsive to receiving operator input, sending a module code to the back-end 508. The UI framework system may when a UI element is selected by an operator send the module code that is associated with the selection of the UI element to the module code verification layer executing on a back-end 112. Or, the UI framework system may send the module code to a controlling application and the controlling application may then send the module code to the back-end system 112. The flow continues with responsive to receiving a module code, requesting information from the UI framework system 510. The module code verification layer may make several requests to the front-end system for information to verify the module code. The information may be requested from the front-end operating system or from the UI framework system executing on the front-end. The module code verification layer may begin by requesting an identification of the process and system that sent the module code. The module code verification layer may have been given the address of the front-end system and a process ID as part of the module code. The module code verification layer may request an identification for the UI, and may further request information related to the design of the UI, and information related to execution time status of the UI. The flow continues with responsive to a request, providing information for the UI 512. The front-end system may respond to the request for information from the module code verification layer. The operating system of the front-end may respond to requests for information such as an identifier for the UI. The UI framework system may respond to a request for information regarding design time and execution time status information for the UI. The UI framework may use a UI definition table and a UI status table to respond to the request for information from the module code verification layer.

The flow continues with verifying whether the module code is valid 514. The module code verification layer may verify the module code based on information received from the front-end system 110. The module code verification layer may have determined a technical name for the UI in order to access the UI information from the UI framework system and/or the front-end system. If a UI is not currently associated with the module code the module code verification layer may report that the module corresponding to the module code should not be executed. The module code verification layer may check if the module code should be executed on the back-end by examining tables associated with the UI framework system such as a UI definition table and a UI status table. The module code verification layer may examine the UI definition table to determine the name of the UI element associated with the module code and then examine the UI status table to determine whether the UI element was enabled or disabled or not displayed. If the UI element was enabled then the module code verification layer may determine which module corresponds to the module code. The module code verification layer may then execute the module corresponding to the module code. The module code verification layer may not directly execute the module corresponding to the module code, but may instruct another module residing on the back-end system 112 to execute the module corresponding to the module code.

Figure 6:
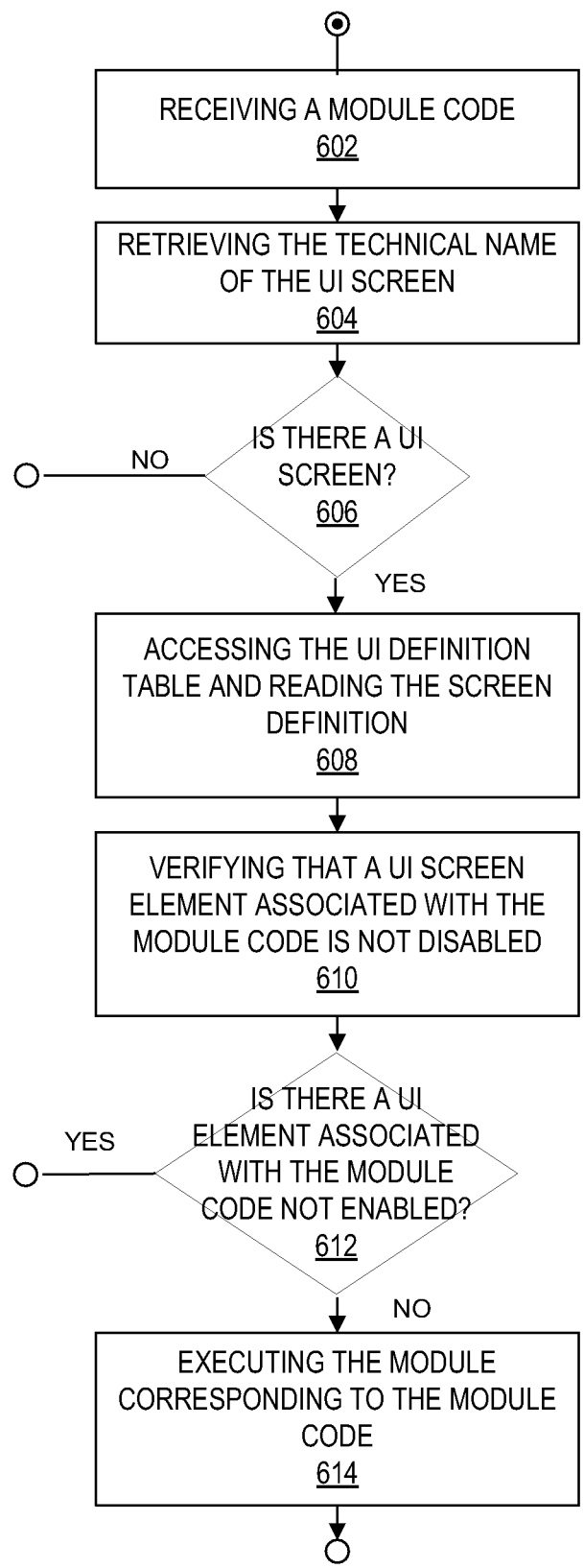
FIG. 6 illustrates an embodiment of a method for a module code verification layer.

FIG. 6 illustrates an embodiment of a method for a module code verification layer. The flow begins with receiving a module code 602. The module code verification layer may reside on a back-end system and receive a module code from a front-end system. The flow continues with retrieving the technical name of the UI screen 604. The module code verification layer may use a process ID included with the received module code to access the technical name of the UI screen from the operating system of the front-end system, or from the UI framework system residing on the front-end system. The UI technical name may also be obtained by using other information included with the module code. The module code verification layer may communicate with the front-end system over a communications network. The flow continues with is there a UI screen? 606. If there is not a UI screen that is being presented on the front-end system that is associated with the module code, then the method may end and the module corresponding to the module code is not executed. An error may be reported to the UI framework system or to another administrative system. The flow continues with accessing the UI definition table and reading the UI screen definition 608. The module code verification layer may access the UI definition table, which is created during the definition of the UI screen, with support modules or methods from the UI framework system. The UI definition table allows the module code verification layer to determine the names of each of the UI elements associated with the UI screen that are associated with the module code. After accessing the UI definition table the module code verification layer has a list of names of UI elements that is used by the UI framework system (the UI elements may be buttons, text fields, drop-down menus, etc.) The flow continues with verifying that a UI screen element associated with the module code is not disabled 610. In an embodiment, the module code verification layer may access a UI status table, which is a run-time table indicating the status of the UI elements, to determine whether or not one of the UI elements retrieved from the UI definition table is not enabled. The module code verification layer may use the names of the UI elements retrieved from the UI definition table to access the rows of the UI status table. The flow continues with is there a UI element associated with the module code not enabled? 612. The module code verification layer will not execute the module associated with the module code if there is a UI element that is not enabled and associated with the module code. This prevents a module code that may have been entered from a module code UI element, or may have originated from hacking from being executed. In an embodiment, the module code verification layer will execute the module corresponding to the module code if there is at least one UI element that is enabled and associated with the module code. In an embodiment, the module code verification layer will verify that the module code was actually generated by the selection of an enabled UI element. The flow continues with executing the module corresponding to the module code. The module code verification layer may call a method or module that is part of the UI framework system that executes the module associated with the module code. In an embodiment, the module verification layer will execute the module associated with the module code directly. Once the module corresponding to the module code has been executed the method may end. One skilled in the art will appreciate that no application specific code for the application controlling the UI is necessary to implement this method.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer implemented method of executing UI elements on a front-end computer system by validating module codes associated with the UI elements on a back-end computer system, wherein the front-end computer system is connected to the back-end computer system via a network, the method comprising:
responsive to receiving a module code associated with a UI element on the back-end computer system from one of a plurality of processes executing on the front-end computer system, wherein the module code is associated with the UI element by retrieving a technical name of a UI screen associated with the one process from a kernel of an operating system executing on the front-end computer system:
determining if the UI screen exists;
if the UI screen does not exist, reporting that the module corresponding to the module code will not be executed, and ending the method;
if the UI screen exists, retrieving, via the network, a status of the UI element stored in a UI status table at the front-end computer system;
verifying whether the module code is valid for the UI screen based on the status, the verifying including verifying whether the UI screen is enabled; and
if the module code is valid and the UI screen is enabled, executing a module corresponding to the module code;
otherwise reporting that the module is not valid and the UI screen is not enabled.

2. The method of claim 1, wherein verifying further comprises: determining whether each UI screen element associated with the UI screen is enabled; and if each UI screen element associated with the UI screen is enabled, then the module code is valid; otherwise the module code is not valid.

3. The method of claim 1, wherein verifying further comprises:
determining whether a UI screen element associated with the UI screen is not enabled; and
if a UI screen element associated with the UI screen is not enabled, then the module code is not valid;
otherwise the module code is valid.

4. The method of claim 1, wherein associating further comprising: if an association cannot be made between the module code and the one process then reporting that the module corresponding to the module code will not be executed, and ending the method.

5. The method of claim 1, wherein associating the module code further comprises:
retrieving a technical name of the UI screen from a UI framework system;
if there is no UI screen currently executing on the front-end computer system then reporting that the module corresponding to the module code will not be executed, and ending the method.

6. The method of claim 1, wherein verifying further comprises:
accessing a UI definition table to determine which UI elements of the UI screen are associated with the module code;
accessing the UI status table to determine a status of each UI element associated with the module code;
if each UI screen element associated with the module code is enabled, then the module code is valid; otherwise the module code is not valid.

7. The method of claim 1, wherein verifying further comprises:
if the module code was generated from the selection of a user interface element by a user, then the module code is valid;
otherwise the module code is not valid.

8. The method of claim 1, wherein the information from a UI framework system on the front-end computer system includes a UI definition table and the UI status table.

9. The method of claim 1, further comprising:
displaying a plurality of user interface elements via the one process, the plurality including a plurality of graphical elements each corresponding to a respective module code and at least one interface element for direct entry of a module code by an operator,
when a module code is entered by an operator: sending the module code to the back-end computer system.

10. The method of claim 1, wherein the front-end computer system and the back-end computer system reside on the same computer system.

11. A back-end computer system for validating module codes, the back-end computer system being communicatively connected to a front-end system that is configured to execute UI elements, the system comprising:
a processor configured with a module code verification layer module, wherein the module code verification layer module is adapted to respond to receiving a module code associated with a UI element by:
retrieving, via the network, a technical name of a UI screen associated with a process from a kernel of an operating system executing on the front-end computer system;
determining if the UI screen exist;
if the UI screen does not exist, reporting that the module code verification layer module corresponding to the module code will not be executed, and ending the method;
if the UI screen exists, retrieving, via the network, a status of the UI element stored in a UI status table at the front-end computer system;
verifying whether the module code is valid for the UI screen based on the status, the verifying includes verifying whether the UI screen is enabled; and
if the module code is valid and the UI screen is enabled, executing a module corresponding to the module code;
otherwise reporting the module is not valid and the UI screen is not enabled.

12. The back-end computer system of claim 11, wherein the module code verification layer module is further adapted for verifying by:
determining whether each UI screen element associated with the module code is enabled; if each UI screen element associated with the module code is enabled, then the module code is valid; otherwise the module code is not valid.

13. The back-end computer system of claim 11, wherein the module code verification layer module is further adapted for verifying by:
determining whether a UI screen element associated with the UI screen is not enabled; and
if a UI screen element associated with the UI screen is not enabled, then the module code is not valid; otherwise the module code is valid.

14. The back-end computer system of claim 11, wherein the module code verification layer module is further adapted for associating by:

associating the module code with one process of the plurality of processes executing on a front-end system, the one process having a user interface (UI) screen, the UI screen having screen elements;

if an association cannot be made between the module code and one process then reporting that the module corresponding to the module code will not be executed.

15. The back-end computer system of claim 11, wherein the module code verification layer module is further adapted for verifying by:

if the module code was generated from the selection of a user interface element by a user, then the module code is valid, otherwise the module code is not valid.

16. The back-end computer system of claim 11, further comprising:

an application program including logic for controlling the UI residing on the front-end computer system;

a user interface framework module, including a UI definition table containing design time information, and the UI status table containing execution time information; and wherein the user interface framework module is adapted for:

responding to requests for information from the module code verification module by providing information associated with the UI from the UI definition table and the UI status table;

displaying a plurality of user interface elements via the front end process, the plurality including a plurality of graphical elements each corresponding to a respective module code and at least one interface element for direct entry of a module code by an operator; and when a module code is entered by an operator: sending the module code to the back-end computer system.

17. The back-end computer system of claim 11, wherein the front-end computer system and the back-end computer system resides on the same computer system.

18. A machine-readable non-transitory medium having stored thereon machine-executable codes that, when executed, performs a method executing UI elements on a front-end computer system by validating module codes associated with the UI elements on a back-end computer system, wherein the front-end computer system is connected to the back-end computer system via a network, the method comprising:

responsive to receiving a module code associated with a UI element on the back-end computer system from one of a plurality of processes executing on the front-end computer system, wherein the module code is associated with the UI element by retrieving a technical name of a UI screen associated with the one process from a kernel of an operating system executing on the front-end computer system:

determining if the UI screen exist;

if the UI screen does not exist, reporting that the module corresponding to the module code will not be executed, and ending the method;

if the UI screen exists, retrieving, via the network, a status of the UI element stored in a UI status table at the front-end computer system;

verifying whether the module code is valid for the UI screen based on the status, the verifying includes verifying whether the UI screen is enabled; and if the module code is valid and the UI screen is enabled, executing a module corresponding to the module code;

otherwise reporting that the module is not valid and the UI screen is not enabled.

* * * * *